United States Patent
Hattori et al.

(10) Patent No.: US 6,514,142 B1
(45) Date of Patent: *Feb. 4, 2003

(54) PICTURE PROCESSING DEVICE AND GAME DEVICE USING THE SAME

(75) Inventors: Takanori Hattori; Tatsuya Watanabe, both of Tokyo (JP)

(73) Assignee: Sega Enterprises, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/776,224

(22) PCT Filed: May 24, 1996

(86) PCT No.: PCT/JP96/01398

§ 371 (c)(1),
(2), (4) Date: Mar. 26, 1997

(87) PCT Pub. No.: WO96/37863

PCT Pub. Date: Nov. 28, 1996

(30) Foreign Application Priority Data

May 24, 1995 (JP) .............................. 7/125283

(51) Int. Cl.[7] .................................. A63F 9/24
(52) U.S. Cl. .......................................... 463/31; 345/474
(58) Field of Search .............................. 463/23, 31–33, 463/34; 345/473, 474, 957, 952, 958

(56) References Cited

U.S. PATENT DOCUMENTS

| 4,116,444 A | 9/1978 | Mayer et al. |
| 4,145,043 A | 3/1979 | Olliges |
| 4,148,485 A | 4/1979 | Rains |
| 4,189,728 A | 2/1980 | Stubben |
| 4,324,401 A | 4/1982 | Stubben et al. |
| 4,398,189 A | 8/1983 | Pasierb, Jr. et al. |
| 4,895,376 A | 1/1990 | Chiung-Shiung-Fei |
| 4,930,074 A | 5/1990 | McCarthy |
| 4,951,229 A | 8/1990 | DiNicola et al. |
| 5,299,810 A | 4/1994 | Pierce et al. |
| 5,368,484 A | 11/1994 | Copperman et al. |
| 5,405,151 A | * 4/1995 | Naka et al. ................. 273/437 |
| 5,498,003 A | * 3/1996 | Gechter ....................... 463/31 |
| 5,513,307 A | 4/1996 | Naka et al. |
| 5,592,602 A | 1/1997 | Edmunds et al. |
| 5,660,547 A | * 8/1997 | Copperman .................. 434/29 |
| 5,675,720 A | 10/1997 | Sato et al. |
| 5,689,682 A | 11/1997 | Peasley et al. |
| 5,692,144 A | 11/1997 | Thrush |
| 5,694,560 A | 12/1997 | Uya et al. |

FOREIGN PATENT DOCUMENTS

JP    Hei7(1995)-75689    3/1995

OTHER PUBLICATIONS

"Nighthawk F–117A Stealth Fighter 2.0" by MicroProse, 1993.*

(List continued on next page.)

Primary Examiner—Joe H. Cheng
Assistant Examiner—Kim T. Nguyen
(74) Attorney, Agent, or Firm—Lackenbach Siegel, LLP

(57) ABSTRACT

A picture processor for processing a plurality of objects which include a user-controlled object and a specific object each moving against a background, and existing in a virtual three-dimensional coordinate space, and displaying an image of the objects, operation signals obtained so that movement of the user-controlled object is controlled In the coordinate space according to operation signals from the processor comprising moving direction control for adjusting relative movement between the objects so that user-controlled and enemy objects on a display device move in the same direction while the enemy object is positioned in front of the user-controlled object, and the moving direction control is released when the user-controlled object reaches the specific enemy object, and a picture is developed on the display device.

13 Claims, 13 Drawing Sheets

OTHER PUBLICATIONS

Selections from magazine "Game Walker," May. 1995, No. 7.

Selections from magazine "Game Walker," Jan. 1995, No. 3, p. 35, and relevant portion translated into English.

Selections from magazine "Game Walker," Dec. 1994, No. 2, p. 55, and relevant portion translated into English.

Selections from magazine "Game World," Sep. 1, 1993 issue.

Selections from magazine "Air Combat," Jul. 2, 1993 issue.

"Star Wars" Atari Game description from web site: http://www.gamearchive.com/video/manufaturer/atari/vector/html/starwars.html—dated Dec. 8, 1998.

"Starblade" Namco, Ltd. Game description from web site (in Japanese, with translation of relevant passages into English):http://www.namco.co.jp/main/cs/ps/starblade/index.html—dated Dec. 8, 1998.

"Panzer Dragoon" Sega Enterprises, Ltd. description from web site (in Japanese, with translation of relevant passages into English):http://www.sega/p_cafe/DB/09015/09019.html—dated May 31, 1999; and http://www.sega.co.jp/sega/pc/pd/pd.htm—dated May 31, 1999.

*Patent Abstracts of Japan,* vol. 096, No. 001, Jan. 31, 1996, for JP 07 244 743A, Sep. 19, 1995.

\* cited by examiner

PICTURE PROCESSING DEVICE AND GAME DEVICE USING THE SAME

TECHNICAL FIELD

The present invention relates to a picture processing device. Particularly, this invention relates to a picture processing device used for a game device. More particularly, this invention relates to a game device for an air battle game which imitates battle techniques of a plurality of aircraft.

BACKGROUND ART

With the progress of computer graphics technology in recent years, picture processing devices, such as game devices and simulation devices, have become widely popular in general. A game device comprises, for example, peripherals such as joysticks (operation sticks), switch buttons a and monitor, and a main game device for conducting data communication with the peripherals or for executing picture processing or sound processing. Since the picture processing of this game device weighs very heavily in enhancing the product value, the technique of animation reproduction has become precise in these days.

In this type of game device, the main game device has a computer device built-in for executing previously stored game programs and is designed to give operation signals, which command the movement of characters, background and objects, etc. expressed in a game, from the peripherals to the computer device. The game device also comprises a display for displaying picture in accordance with game developments as a game program is executed by the computer device, and a sound device for generating sounds in accordance with game developments.

As one field of the game device having such structure, there is a game device which performs a game of air battle between a player's aircraft and opponents' aircraft. This air battle game simulates a situation in which a game player controls the joystick (or operation stick) to move the player's aircraft toward behind the opponent's aircraft to attack the opponent's aircraft.

In this type of air battle game, aircraft appear which can move in free directions in a three-dimensional space. Accordingly, aircraft and background are composed of a plurality of polygons in a three-dimensional coordinate space, and picture processing means of the main game device executes picture processing to generate an image, as seen from a predetermined viewpoint, of the aircraft, background, etc. in this coordinate space.

However, when controlling the player's aircraft in the three-dimensional space, a very high skill is required to control the course and direction of the player's aircraft at the aimed route, and it is very difficult to adjust the player's aircraft at the moving direction of the opponent's aircraft and to make the player's aircraft positioned behind the opponent's aircraft. Therefore, an air battle game device is provided which is designed to move the player's aircraft and the opponent's aircraft in almost the same direction to make the player's aircraft easily positioned behind the opponent's aircraft (for example, as provided in a game device named "WING WAR (Trademark)" manufactured by SEGA ENTERPRISES LTD.).

However, with this type of game device, a moving course of the opponent's aircraft is programmed so as to be associated with or follows a moving course of the player's aircraft and the moving directions of these aircraft are forced to be controlled in the same direction and, therefore, a viewpoint tends to be fixed. As a result, this makes an image displayed on the screen monotonous, causing a problem that attractiveness and interest given to the player or operator is diminished.

Moreover, there is a problem that a player cannot deal with a picture processing state where the player's aircraft and the opponent's aircraft oppose to each other, for example, by passing by each other, because such processing state should pass by instantly with high relative speeds between the aircraft in a game programmed so as to give these aircraft moving speeds in a three-dimensional space in a manner in accordance with the conventional simulation program technique. Such conventional programming technique should hinder from providing a game device which enables easy operation of objects and realizes superior attractiveness and interest.

Accordingly, an object of the present invention is to provide a picture processing device which will not diminish attractiveness or interest to be given to the player even if the moving directions of a plurality of objects are controlled to be almost the same direction.

Another object of this invention is to provide a picture processing device which enables the player or operator to sufficiently deal with the state in which a plurality of objects oppose to each other by, for example, passing by each other.

A further object of this invention is to provide a game device with a picture processing device which will achieve the above-described objects of this invention.

DISCLOSURE OF THE INVENTION

In order to achieve the first object, this invention is characterized in that it comprises picture processing means for executing picture processing to display an image, as seen from a predetermined viewpoint, of a plurality of objects existing in a three-dimensional coordinate space onto displaying means, that this picture processing means executes picture processing to move the objects in the coordinate space in accordance with operation signals from operating means for operating the objects, and that the picture processing means comprises: moving direction controlling means for moving a plurality of objects in the same direction; and moving direction control releasing means for releasing the moving direction control at a certain point during the picture processing.

Moreover, this invention is characterized in that the moving direction controlling means comprises:

moving direction detecting means for detecting the moving direction of a first object; and moving direction setting means for setting the moving direction of a second object at the moving direction of a first object on the basis of the detection results.

This invention is characterized in that the picture processing means further comprises moving direction re-controlling means for moving the objects along another course after the moving direction control is released by the moving direction control releasing means.

This invention is characterized in that the moving direction controlling means further comprises moving range regulating means for regulating the range within which the first object can move in the coordinate system on the basis of the operation signals.

This invention is characterized in that the moving direction regulating means regulates the moving range of the first object in an absolute coordinate system and outputs a command to the moving direction setting means to set the moving direction of the second object at the moving direction of the first object in a relative coordinate system.

This invention is characterized in that the moving direction re-controlling means moves the object along a course to fly around a specific object when the picture processing is executed to display the specific object on the displaying means.

In order to realize an image as seen from a viewpoint which moves diversely, this invention is characterized in that it comprises picture processing means for executing picture processing to display an image, as seen from a predetermined viewpoint, of a plurality of objects existing in a three-dimensional coordinate space onto displaying means, that the picture processing means executes picture processing to move the objects in the coordinate space in accordance with operation signals from operating means for operating the objects, and that the picture processing means comprises object movement controlling means for moving a first object along a course to fly around a second object.

This invention is characterized in that the operating means outputs operation signals to move the objects in a predetermined direction in the three-dimensional coordinate system.

In order to achieve the second object, this invention is characterized in that it comprises picture processing means for executing picture processing to display an image, as seen from a predetermined viewpoint, of a plurality of objects existing in a three-dimensional coordinate space onto displaying means, that the picture processing means executes picture processing to move the objects in the coordinate space at a predetermined speed in accordance with operation signals from operating means for operating the objects, and that the picture processing means comprises:

first means for moving a plurality of objects in directions opposite to each other in the space; and second means for controlling a relative speed of the plurality of objects moving in directions opposite to each other at a value lower than a relative speed of the objects moving in directions not opposite to each other.

This invention is characterized in that the first means executes picture processing to cause the plurality of objects to pass by each other in directions opposite to each other along substantially the same course, and that the second means detects that the processing is in this picture processing mode and comprises speed setting means for moving these objects in the same direction in the coordinate space and for giving a predetermined relative speed to these objects.

This invention is characterized in that the speed setting means sets the relative speed so that a time required for the plurality of objects to pass by each other in the three-dimensional coordinate space corresponds with a predetermined time.

This invention is characterized in that it comprises displaying means and the above-described picture processing device in order to provide a game device comprising the above-described picture processing device.

According to this invention, the moving direction controlling means subjectively executes, for example, the picture processing to move a plurality of objects in the same direction. The moving direction control releasing means gives a command to the moving direction controlling means to release this control at a certain point during the picture processing on the basis of developments, etc. of the picture processing.

Upon receiving this release command, The moving direction controlling means terminates the control to move the plurality of objects in the same direction. Then, the picture processing means can execute picture processing to move the objects apart from this moving direction control. As a result, the limitation over the moving range of a viewpoint to move the plurality of objects in almost the same direction is released and the moving range of the viewpoint is expanded to cover other areas. Accordingly, movements of the viewpoint can be diversified and the image displayed on the screen can be changed to a high grade image with enhanced interest or attractiveness to be given to the operator.

Moreover, according to this invention, the moving direction detecting means detects the moving direction of the first object and outputs the detection results to the moving direction setting means. The moving direction setting means sets the moving direction of the second object at the moving direction of the first object on the basis of the detection results. As a result, it is possible to adjust the moving direction of the second object at the movements of the first object with certainty.

Furthermore, according to this invention, the moving direction re-controlling means moves the object along another course after the moving direction control is released. Therefore, even after the moving direction control is once terminated, it is possible to control the direction of the object as changing the viewpoint position.

According to this invention, the moving range regulating means regulates the range within which the first object can move in the three-dimensional coordinate system on the basis of operation signals. This regulation relaxes the movements of the second object in order to move the second object in the moving direction of the first object, and prevents the second object from moving violently on the displaying means.

This invention specifically provides the above-described regulating means, and this regulating means regulates the moving range of the first object in an absolute coordinate system and outputs to the moving direction setting means a command to set the moving direction of the second object at the moving direction of the first object in a relative coordinate system. Accordingly, it is easy to realize the situation where the movements of the second object to follow the first object are relaxed and the moving direction of the second object corresponds with the moving direction of the first object.

According to this invention, the moving direction re-controlling means proceeds to the processing to move the object along a course to fly around a specific object at the point of picture processing to display the specific object on the displaying means. In the course of the object to fly around the specific object, movements of the viewpoint against the object are diversified as the viewpoint moves around the specific object. Accordingly, it is possible to simplify the operation to move the object at a certain point during the picture processing and to provide a high-grade, diversified and varied image by diversifying the movements of the viewpoint when necessary.

According to this invention, the picture processing means executes the processing to move the first object along a course to fly around the second object. In the course of the first object to fly around the second object, the movements of the viewpoint against the object are further diversified as the viewpoint also moves around the second object. Accordingly, it is possible to provide a varied image with diversified movements of the viewpoint and with superior attractiveness and interest.

According to this invention, the operating means outputs to the picture processing means the operation signals to move the object in a predetermined direction in the three-dimensional coordinate space. Accordingly, it is possible to apply the above-described picture processing device to, for example an air battle game device which moves the objects in a predetermined direction in the three-dimensional space.

According to this invention, the first means executes the processing to move a plurality of objects in directions opposite to each other in the above-mentioned space. The second means detects that this processing is executed and then sets a relative speed of the plurality of objects moving in mutually opposite directions at a value lower than a relative speed of these objects moving not in opposite directions. Accordingly, although the opposing action (mainly, passing by) of the plurality of objects would terminate in a short time if the plurality of objects move in opposite directions at the same speed as the relative speed of the objects moving not in opposite directions, the time required for such opposing action is extended when the lower relative speed is applied as described above. Therefore, the player or operator can sufficiently deal with this situation and give necessary operation inputs to the operating means.

According to this invention, the second means detects that the plurality of objects are in the picture processing state where these objects pass by each other in opposite directions along substantially the same course. The second means then moves these objects in the same direction in the coordinate space on the basis of the detection results, that is, moves one object backward in the coordinate space and gives a predetermined relative speed to these objects in order to lower the relative speed of these objects.

According to this invention, the speed setting means sets the relative speed of the objects so that the time required for the plurality of objects to pass by each other in the three-dimensional coordinate space becomes a predetermined time, thereby making the time required until these objects pass by each other a desirable figure.

This invention simplifies the operation of the objects by comprising the displaying means and the above-described picture processing device and provides a game device with superior attractiveness and interest.

This invention is a storage medium for storing the procedures for having a computer execute the above-described picture processing. This storage medium may include, for example, a floppy disk, magnetic tape, photomagnetic disk, CD-ROM, DVD, ROM cartridge, RAM cartridge with battery back-up, and nonvolatile RAM cartridge. The storage medium stores information (mainly digital data and programs) by some physical means and is capable of having a processing device such as computers and private processors perform a certain function.

BEST MODE FOR CARRYING OUT THE INVENTION

Figure 1:
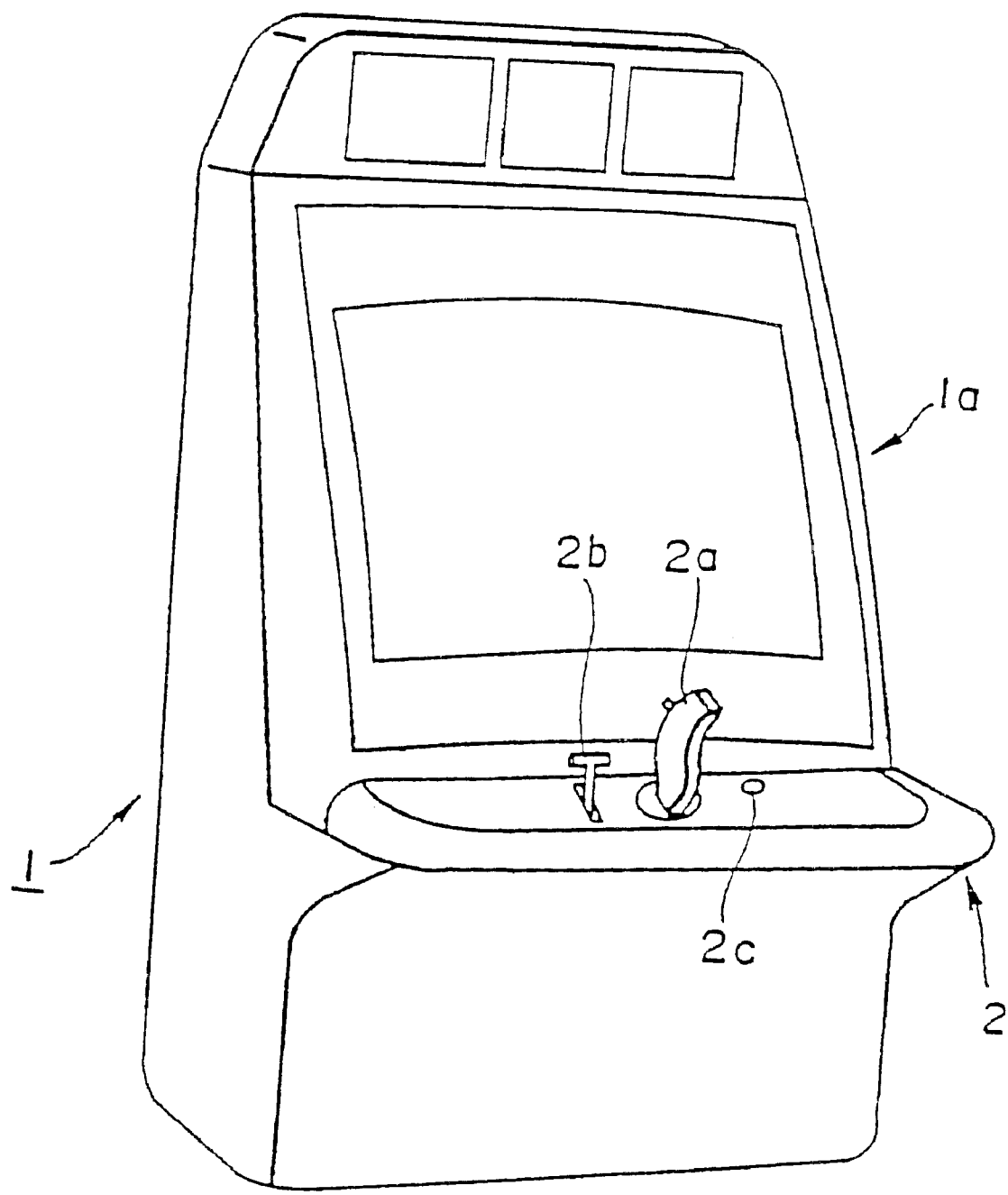
FIG. 1 is a full perspective view of a game device according to one embodiment of the present invention.
Figure 2:
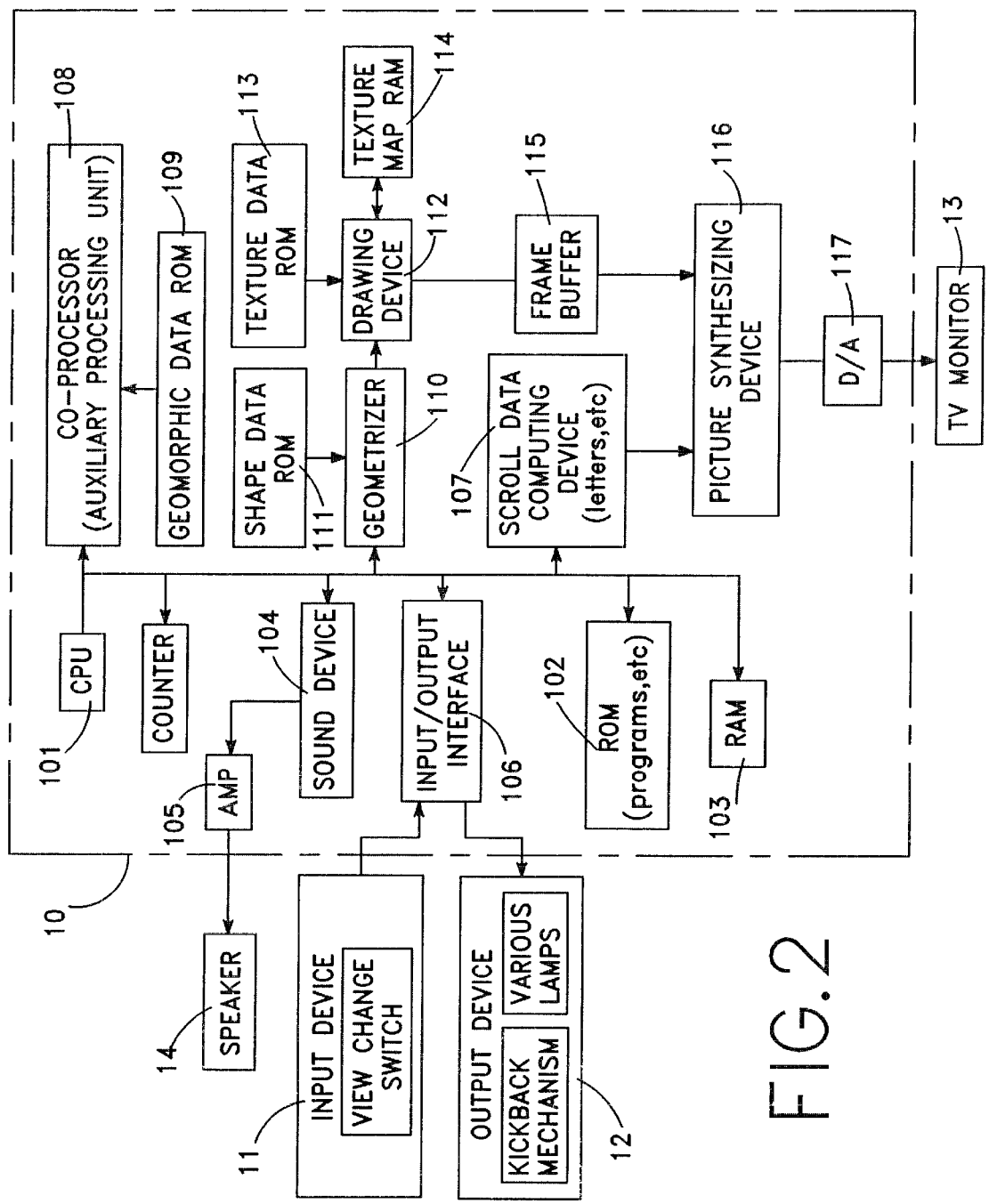
FIG. 2 is a block diagram of this game device.

An embodiment of the present invention is hereinafter explained by referring to the attached drawings. In this embodiment, an explanation is given about an example where the picture processing of this invention is applied to an air battle game device. FIG. 1 is a full perspective view of this game device. Housing 1 is substantially in a box shape, and substrates on which main game device 10 shown in FIG. 2 is assembled are provided within housing 1. On the front face of the housing, a CRT-type display 1a and an operation panel 2 are provided.

On this operation panel, an operation stick 2a, which serves as a joystick, throttle 2b, and joypad 2c for commanding game operations including start are provided.

The game player sits on a chair (not shown) which is set integrally with housing 1 in front of housing 1, and operates an aircraft (player's aircraft: first object) displayed on display 1a against other aircraft (opponent's aircraft: second object) by operating the operation stick 2a, etc. The flying course and flying direction of the player's aircraft can be controlled by using the operation stick 2a and the speed of the player's aircraft can be controlled by using a throttle lever 2b. The opponent's aircraft are caused to appear and are controlled by a microcomputer on the game device side in accordance with a predetermined program. It is possible to cause the opponent's aircraft to be controlled by an opponent game player by, for example, connecting two game devices.

FIG. 2 shows a block structure of this game device. This game device comprises, as its basic elements, a main game device 10 composed of a microcomputer, input device 11, output device 12, monitor 13 and speaker 14.

The input device (or operating means) 11 has the operation stick and the throttle lever as described above and also has a view change (or viewpoint changing) switch 2d, etc. as necessary. This viewpoint changing switch provides a selection of viewpoints to the player. For example, either an image of the player's aircraft against the opponent's aircraft as seen from the viewpoint at the cockpit of the player's aircraft or an image of the player's aircraft against the opponent's aircraft as seen from the viewpoint close to upper behind the player's aircraft off to the right or left can be selected. This game device may comprise a kickback mechanism to adjust the operation power of the operation stick, and an output device 13 which comprises various types of lamps, as necessary. A projector may be used instead of the monitor 13.

The main game device 10 has CPU (central processing unit) 101 and also comprises ROM 102, RAM 103, sound device 104, input/output interface 106, scroll data computing device 107, co-processor (auxiliary processing unit) 108, landform data ROM 109, geometrizer 110, shape data ROM 111, drawing device 112, texture data ROM 113, texture map RAM 114, frame buffer 115, picture synthesizing device 116, and D/A converter 117.

CPU 101 is connected via bus lines to ROM 102, which stores predetermined programs and the like, RAM 103 for storing various data, sound device 104, input/output interface 106, scroll data computing device 107, co-processor 108 and geometrizer 110.

RAM 103 functions as the RAM for the buffer, in which various commands (including a command to display characters such as the player's aircraft and the opponent's aircraft) to geometrizer 110 and a matrix at the time of conversion matrix computation are written thereon.

The input/output interface 106 is connected to the input device 11 and the output device 12, thereby operation signals of the operation stick, etc. of the input device 11 are taken in CPU 101 as digital data and signals generated by CPU 101 and other elements can be outputted to the output device 12. The sound device 104 is connected to speaker 14 via the power amplifier 105, and sound signals generated by the sound device 104 are amplified and then given to speaker 14.

According to this embodiment, CPU 101 reads in, based on the program installed in ROM 102, operation signals from the input device 11 and landform data from the landform data ROM 109 or shape data (three-dimensional data of, for example, characters such as the player's aircraft and the opponent's aircraft, landform, and background such as sky) from the shape data ROM 11, and then executes various processing as described later in FIG. 3.

Aircraft behavior calculation is conducted to simulate the movements of the aircraft in a virtual space according to the operation signals sent by the player from the input device 11. After coordinate values in the three-dimensional space are determined, a conversion matrix for converting this coordinate value into a visual field coordinate system and the shape data (such as those concerning the aircraft and landform) are specified at geometrizer 110.

The landform data ROM 109 stores the landform data as well as the shape data of shells to be fired by the player's aircraft, the opponent's aircraft, and the player's aircraft or the opponent's aircraft. In this embodiment, ROM 109 is referred to as the landform data ROM for convenience. Co-processor 108 is connected to the landform data ROM 109 and, therefore, the shape data including the predetermined landform and the aircraft (the player's aircraft and the opponent's aircraft) are given to co-processor 108 (and to CPU 101).

Co-processor 108 is designed mainly to make a collision determination concerning the player's aircraft and the opponent's aircraft (for example, whether or not a shell has hit the aircraft, or whether or not the aircraft has collided with the ground), and to assume mainly the operation of floating points during this determination and the aircraft behavior computation. As result, the determination of contact concerning the aircraft is performed by co-processor 108, and the determination results are given to CPU 101, thereby reducing the computation load on CPU and enabling more rapid performance of this contact determination as well as more rapid picture processing (for example, formation of an explosion picture as described later) at CPU based on the determination results.

Geometrizer 110 is connected to the shape data ROM 111 and the drawing device 112. The shape data ROM 111 has previously stored thereon the polygon shape data (three-dimensional data of plural polygons consisting of respective vertexes, which compose the player's aircraft and the opponent's aircraft, or the background such as landform), and this shape data is delivered to geometrizer 110. Geometrizer 110 perspectively converts the shape data designated by the conversion matrix and sent from CPU 101, thereby obtaining data converted from the coordinate system of the virtual space consisting of three-dimensional coordinates to the visual field coordinate system.

The drawing device 112 pastes textures onto the converted shape data of the visual field coordinate system, and outputs such data to the frame buffer 115. In order to paste the textures, the drawing device 112 is connected to the texture data ROM 113 and the texture map RAM 114, and also to the frame buffer 115. Polygon data means a group of data of relative or absolute coordinates of respective vertexes of polygons (polygons: mainly triangles or quadrangles) which are made of an aggregate of a plurality of vertexes. A plurality of these polygons are combined to compose the shape data of the aircraft and background. CPU 101 composes an image as seen from a predetermined viewpoint position on the basis of the shape data defined in the three-dimensional coordinate space and provides picture signals to the monitor 13.

The landform data ROM 109 stores polygon data, which are set comparatively rough to satisfy the performance of the collision determination concerning the player's aircraft, the opponent's aircraft, or the ground. In contrast, the shape data ROM 111 stores polygon data which are set in more details.

The scroll data computing device 107 computes scroll picture data such as text data. This computing device 107 and the above-mentioned frame buffer 115 are connected to the picture synthesizing device 116 and D/A converter 117 and then to the monitor 13. This allows the polygon picture (simulation results), including the aircraft and ground (background), which is temporarily stored in the frame buffer 115, and the scroll background picture with texture data, such as a speed value, to be synthesized in accordance with a designated priority, thereby generating a completed frame picture data. This picture data is converted by the D/A converter 117 into analog signals and sent to the TV monitor 13, and the picture of the air battle game is displayed on a real time basis.

Actions of this game device are hereinafter explained by referring to FIG. 3. FIG. 3 shows these actions as a main flowchart of CPU 101. As the game device is activated, CPU 101 starts the processing shown in FIG. 3 by means of a timer interruption processing executed at regular intervals (t).

CPU 101 repeatedly executes at predetermined intervals until the termination of the game: processing to move the player's aircraft (S100); processing to make the opponent's aircraft appear and to control the appeared opponent's aircraft (S200); shell firing processing to execute a processing to fire shells or guided missiles from the player's aircraft or the opponent's aircraft and to move these shells (S400); collision processing to execute an explosion picture appearing processing, etc. as described later on the basis of the results of collision determination executed by coprocessor 108 concerning a collision between the aircraft (the player's aircraft or the opponent's aircraft) and the ground or a collision between the aircraft and the shell (S500); and processing to produce a radioscopic conversion matrix for perspectively converting the respective three-dimensional shape data based on the above respective processing into the visual field coordinate system, and to specify this matrix as well as the shape data at the aforementioned geometrizer 110 via RAM 103, thereby obtaining a picture of the processing results (S600).

The respective processing S100 through S500 are programmed, for example, in the form of subroutines and will be explained later in more details.

Figure 4:
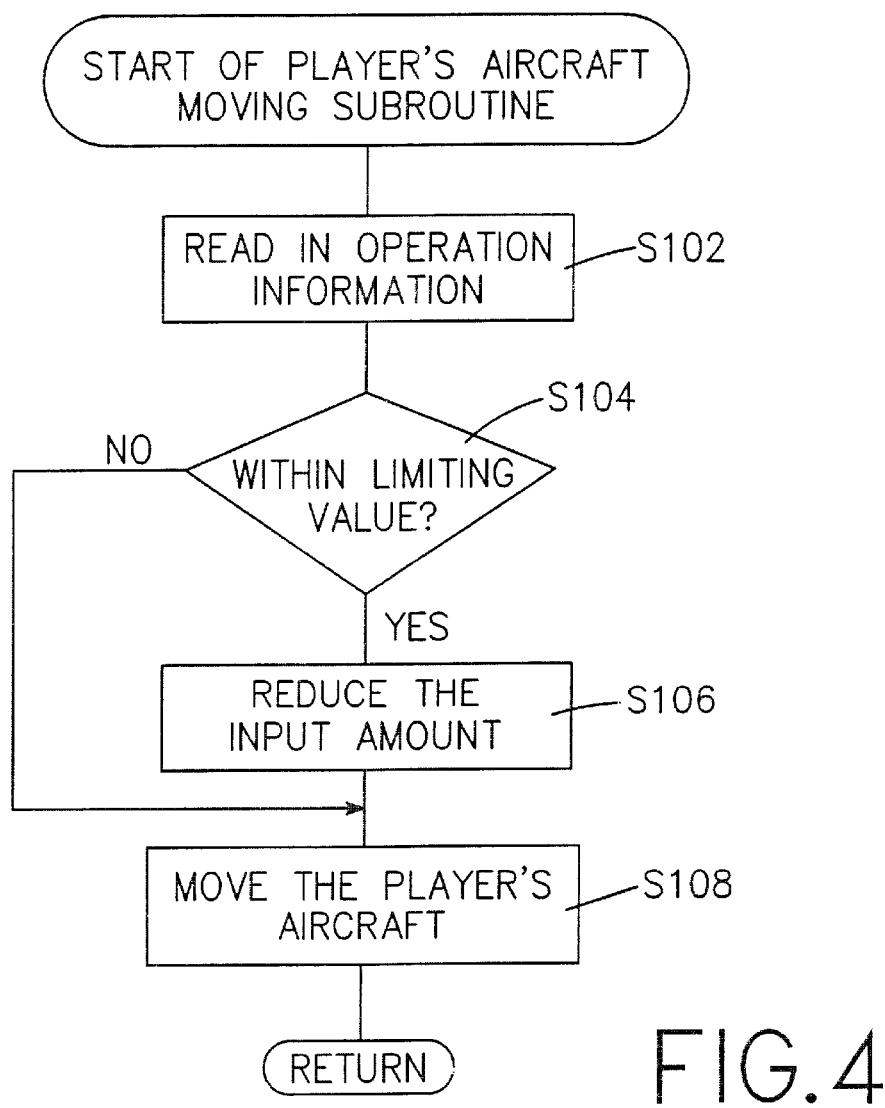
FIG. 4 is a flowchart of a subroutine which describes the player's aircraft movement processing.

FIG. 4 is a detailed flowchart which explains one subroutine of the above-described player's aircraft moving processing (S100). CPU 101 reads in, through the input/output interface 106, the operation information about the player's aircraft as the digital quantity, which is given by operation by the game player of the input device 11 such as the operation stick or throttle, and detects the moving direction of the player's aircraft (S102).

Figure 5:
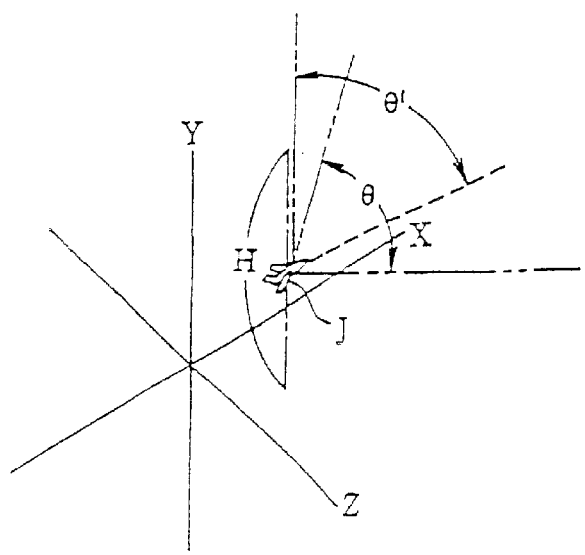
FIG. 5 is a conceptional view showing the range within which the user-controlled object or player's aircraft J existing at a certain point in an absolute coordinate system (in three dimensions) of X, Y and Z axes can move.

As shown in FIG. 5, in this embodiment, the moving range of the player's aircraft J, which exists at a certain position in the absolute coordinate system (in three dimensions) of X, Y and Z axes, is limited to the range defined by height H along the Y-axis direction through that position, angle Θ formed on the X-Z plane, and angle Θ' formed on the Y-X plane.

Accordingly, CPU 101 determines whether or not the input amount from the input device is within the above-described range of limiting value (S104), and if the input amount exceeds the limiting value, the input amount is reduced to the limiting value and the player's aircraft is moved in the three-dimensional coordinate space (S106 and S108). Instead of reducing the input amount, the moving range of the player's aircraft according to the input amount may be limited by a relevant program.

A subroutine other than the player's aircraft moving processing (S100) is hereinafter explained based on FIG. 6. CPU 101 reads in the coordinates of the player's aircraft in the three-dimensional space (S202) and also determines whether or not the read coordinates have reached the appearing range of a boss aircraft, one of the opponent's aircraft, which is the specific object of the present invention (S204).

If the coordinates of the player's aircraft have reached within a predetermined distance from the coordinates of the boss aircraft, for example, the above determination is affirmed and then CPU 101 sets "1" in a course change processing mode flag Fa in a predetermined area of RAM (S206), which shows that it has proceeded from the standard moving processing as described in FIG. 5 to move the player's aircraft described in FIG. 4, to the course change processing mode. On the other hand, if this determination is denied, CPU 101 returns to the processing of FIG. 4 and the standard moving processing state continues.

Figure 7:
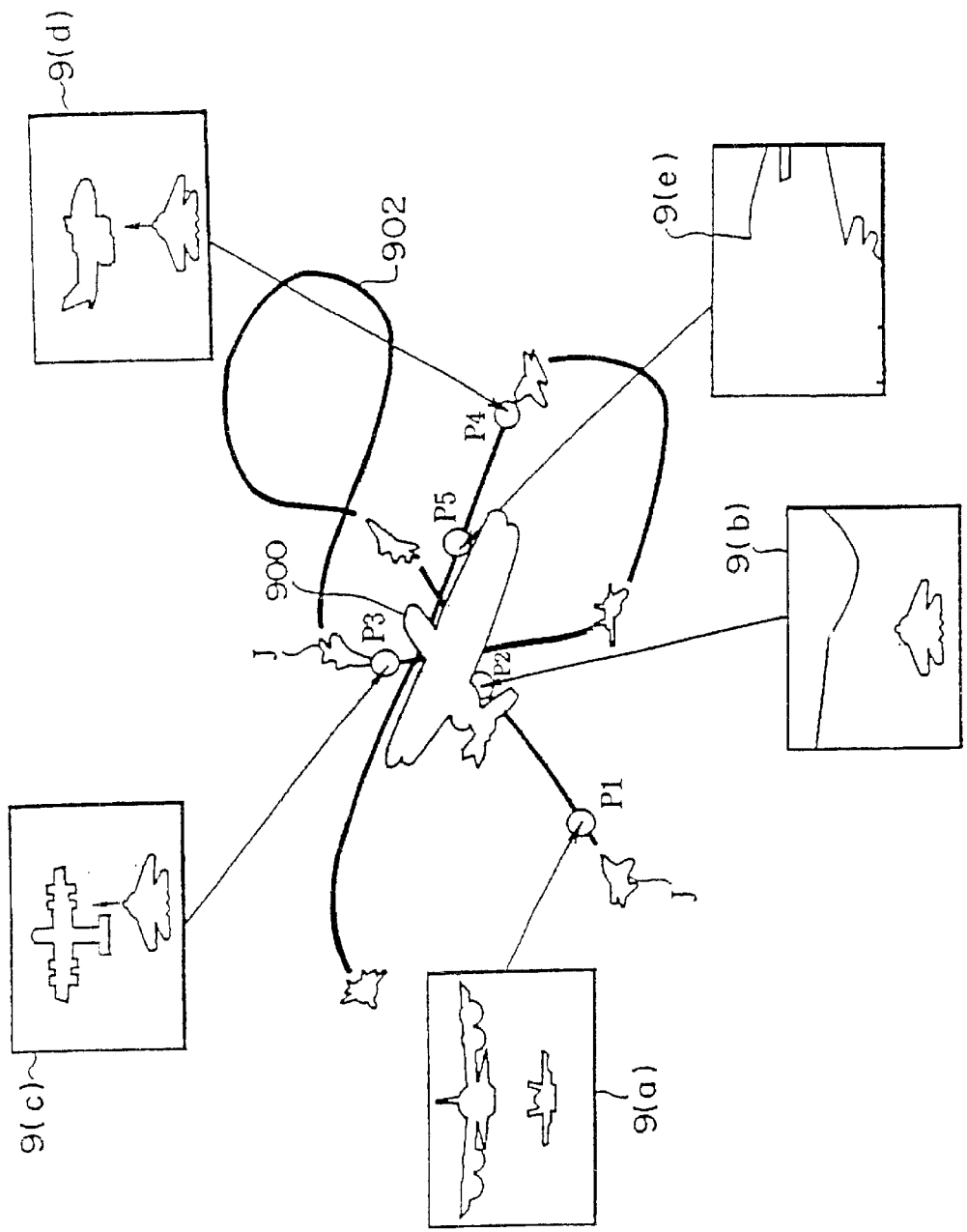
FIG. 7 is a model view which describes a round course set by the player's aircraft line changing processing in the three-dimensional coordinate space.

CPU 101 executes a processing to change the moving direction or course of the player's aircraft to a round course 902 to fly around the boss aircraft 900 as shown in FIG. 7. The round course to fly around the boss aircraft consists of a plurality of points P1 through P5, and coordinate values in the absolute coordinate system and the approach angle of the player's aircraft are set for every point. These data are stored in the shape data ROM 111.

CPU 101 then moves the player's aircraft to coordinates of the starting point of the round course (for example, P1), reads in the coordinates of the remaining points successively, and moves the player's aircraft around these points (S208). When the player's aircraft moves along the round course around the boss aircraft and reaches the starting point again, it is considered as one round.

Figure 3:
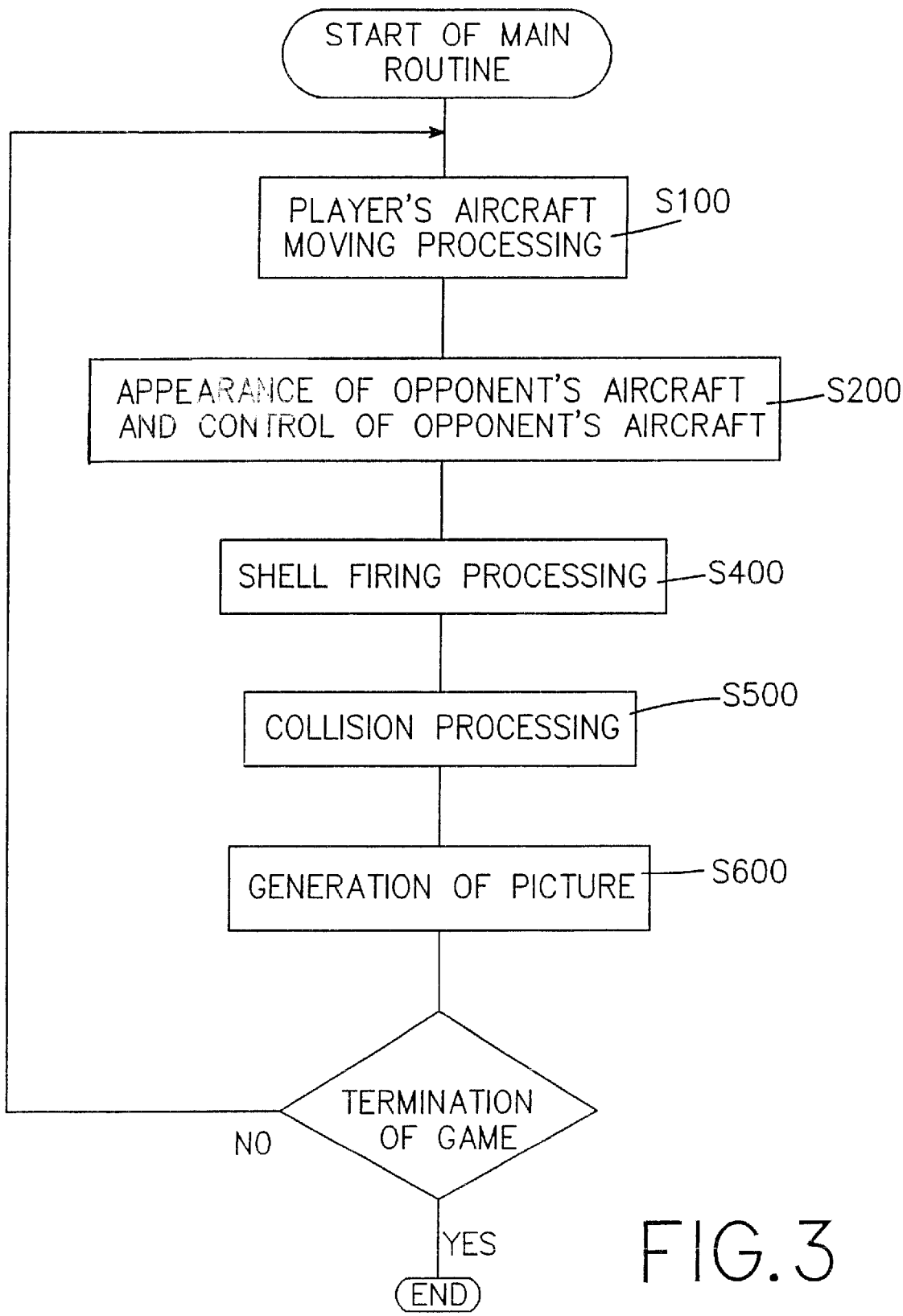
FIG. 3 is a main flowchart of this game device.

Since the course change flag Fa is designed to keep "1" until the player's aircraft completes flying around the course for predetermined times, CPU determines the value of this flag and causes the player's aircraft to move around the round course until the flag value changes to "0" (S210) and then returns to the main routine as shown in FIG. 3.

Means for performing steps S102 through S108 as shown in FIG. 4 may be referred to as "a moving direction controlling means", S102 and S104 "a moving direction detecting means, and S104 and S106 may be referred to as "a moving range regulating means". Similarly, means for performing S202 through S210 as shown in FIG. 6 may be referred to as "a moving direction control releasing means", "moving dection control resetting means" and "object movement controlling means".

Figure 6:
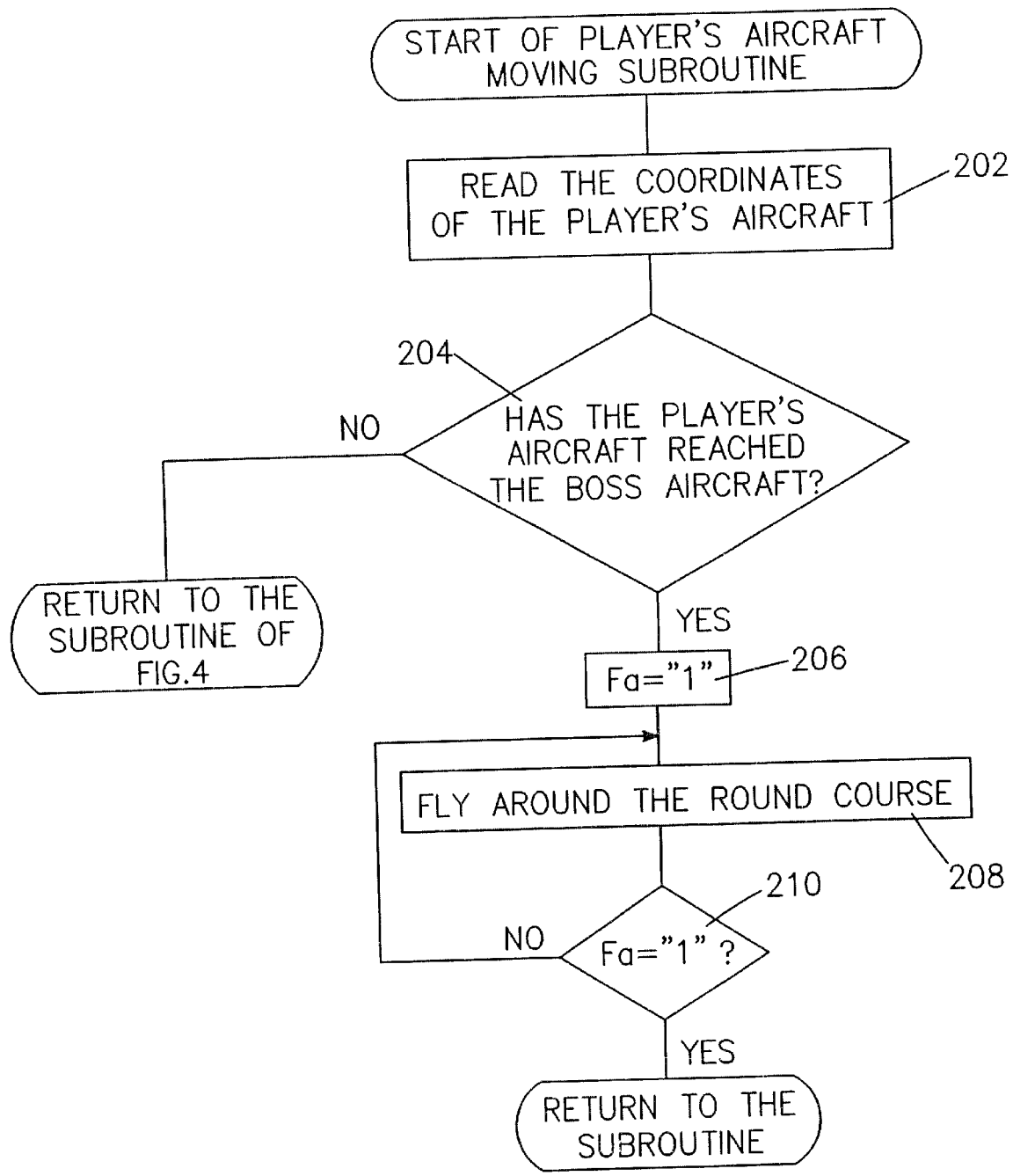
FIG. 6 is a flowchart of another subroutine which describes the player's aircraft movement processing.

According to the processing of the player's aircraft moving subroutine as shown in FIG. 6, an image of the boss aircraft, as seen from the viewpoint at the player's aircraft flying around the boss aircraft, is displayed on the monitor as shown in FIG. 7. Therefore, varied images generated at different viewpoints are provided to the player.

For example, if the aforementioned points of the respective points in the round course are taken as representative examples for explanation, the picture processing to display the following images on the monitor 13 is executed: image 9(a) as seen at P1 from behind the boss aircraft; image 9(b) as seen at P2 from under the bottom of the boss aircraft; image 9(c) as seen at P3 from just above the boss aircraft; image 9(d) as seen at P4 from just beside the boss aircraft; and image 9(e) as seen at P5 from above the wing of the boss aircraft. This course change processing may move the player's aircraft around the boss aircraft while omitting predetermined points on the round course.

Next, one of the subroutines concerning the appearance of the opponent's aircraft and the control of the opponent's aircraft (S200) is hereinafter explained by referring to FIG. 8. CPU 101 reads in the coordinate value of the player's aircraft successively and executes this processing when this coordinate values reaches within a predetermined distance from the coordinate point where the opponent's aircraft starts to appear.

Figure 9:
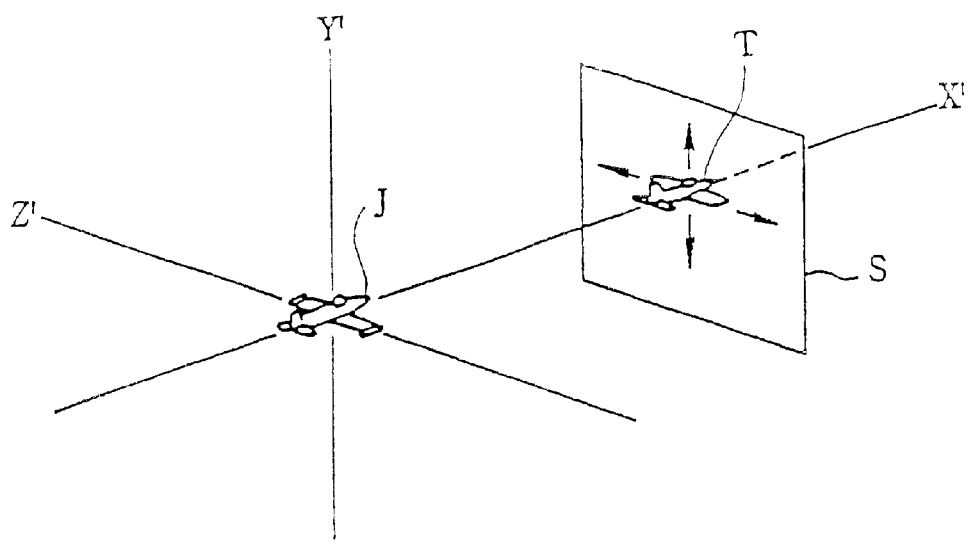
FIG. 9 is a conceptional view which shows a plurality of objects (the opponent's aircraft and the player's aircraft) being set in the same direction.

According to this processing, if the opponent's aircraft moves in the same direction as that of the player's aircraft, CPU 101 executes the processing of standard moving state as shown in FIG. 4 and then sets the moving direction or course of the opponent's aircraft T at a predetermined distance from the player's aircraft along the X' direction which is the moving direction of the player's aircraft in the absolute coordinate system (X', Y', Z') which is set concerning the player's aircraft J, as shown in FIG. 9 (S301).

As a result, the game device of this embodiment moves the player's aircraft and the opponent's aircraft in the same direction in the absolute coordinate virtual space in three dimensions as shown in FIG. 9. The same direction herein used does not necessarily mean completely the same direction. For example, such a situation includes the case where the opponent's aircraft T moves, according to the operation signals from the operation stick 2a, within plane S which is virtually set as being perpendicular to the X' axis.

Figure 10:
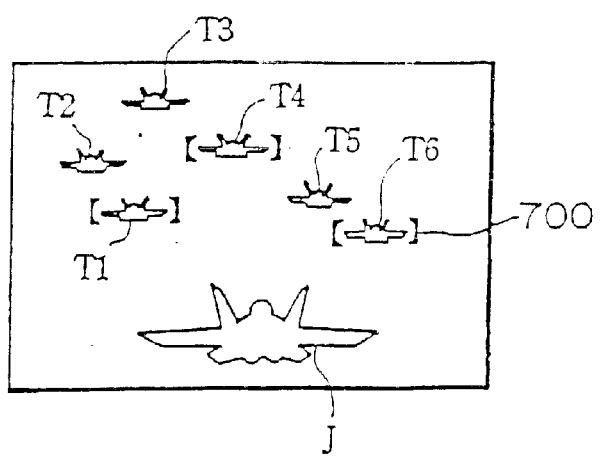
FIG. 10 shows an image taken from the viewpoint which is set behind the player's aircraft.

According to this S301, since the viewpoint is set behind the player's aircraft, even if the operation stick is operated randomly, the image of the player's aircraft J located behind the opponent's aircraft T1 through T6 as shown in FIG. 10 is displayed on the monitor 13. By setting the virtual plane S shown in FIG. 9 within, or in a space extremely wider, than the display range of the monitor in the display coordinate system, it is possible to make the opponent's aircraft T appear in the space within, or in a space extremely wider, than the display range of the TV monitor even if the operation stick 2a is moved violently. In FIG. 10, numeral 700 indicates a target set by the player's aircraft at the opponent's aircraft.

Consequently, it is possible to move the player's aircraft and the opponent's aircraft in the same direction by means of the standard moving processing as shown in FIG. 4 and the above-described S301. In this course control processing, the movable range of the player's aircraft is limited to a predetermined range in the absolute coordinate system as shown in FIG. 5, because the opponent's aircraft would have to be moved violently in accordance with the movements of the player's aircraft and the movements of the opponent's aircraft would become unnatural if the opponent's aircraft is located in the relative coordinate system of the player's aircraft without limiting the movable range of the player's aircraft as described above and, for example, if the player's aircraft is moved at a large angle in the absolute coordinate system.

If the opponent's aircraft is the boss aircraft, the processing of S301 is not applied, and the boss aircraft is set at a programmed coordinate position and the standard moving state of the player's aircraft as shown in FIG. 4 is changed to the course to fly around the boss aircraft as shown in FIG. 6.

Figure 11:
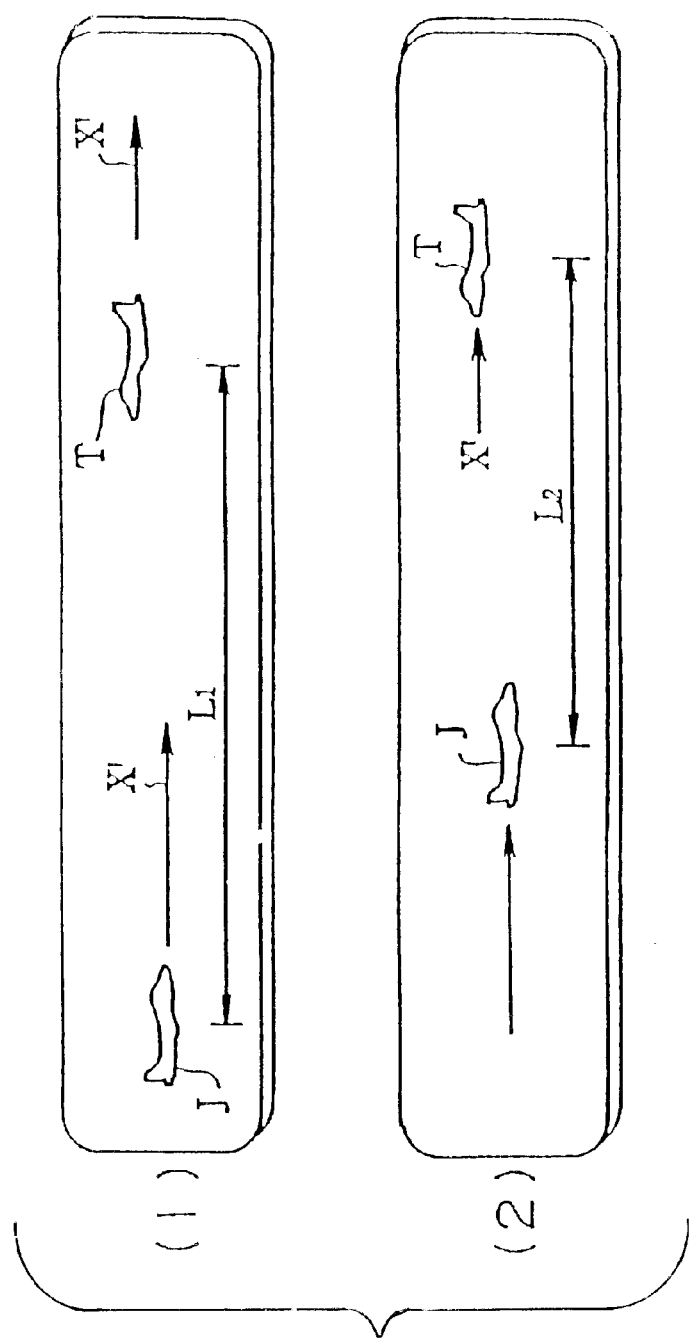
FIG. 11 shows conceptional views which describe the content of relative speed control of the objects in the opposing processing.

If the opponent's aircraft is programmed to advance in a direction opposite to the player's aircraft, the nose of the opponent's aircraft T is set at a direction facing to the player's aircraft J, as schematically and conceptionally shown in two dimensions in FIG. 11, and the opponent's aircraft is set in the X' direction, as shown in FIG. 9, which is the moving direction of the player's aircraft (S302), and then the opponent's aircraft is moved in the same direction, the X' direction, as that of the player's aircraft (in other words, the opponent's aircraft which is going to pass by the player's aircraft is made to move backward). Namely, the relative speed between the player's aircraft J and the opponent's aircraft T would become a large value if the respective moving speeds of the player's aircraft and the opponent's aircraft, which are going to pass by each other in opposite directions, are simply added. However, this processing considerably reduces the relative speed between the player's aircraft J and the opponent's aircraft T by causing the opponent's aircraft to move backward in the three-dimensional coordinate space.

CPU 101 reads in the respective coordinate values of the player's aircraft and the opponent's aircraft and computes a distance between them (S304) and sets the speed of the opponent's aircraft (VT) at a lower value than the speed of the player's aircraft (VJ) so that the player's aircraft passes the opponent's aircraft ahead in the virtual coordinate space in a predetermined time (S306). Accordingly, as the picture processing proceeds, the distance (L2) between the player's aircraft and the opponent's aircraft at a certain point becomes gradually shorter than the distance (L1) between these aircraft before that point, as shown in FIG. 11(1) and then in FIG. 11(2).

CPU 101 reads in the coordinate values of the player's aircraft and the opponent's aircraft successively, and if the player's aircraft passes the opponent's aircraft ahead in the coordinate system or if the collision determination (described later) between a shell fired by the player's aircraft and the opponent's aircraft is affirmed, CPU 101 determines whether or not a processing to extinguish the opponent's aircraft has been executed (S309). If this determination is denied, the processing of S304 and the following steps is executed again. If this determination is affirmed, it returns to the main routine.

Figure 8:
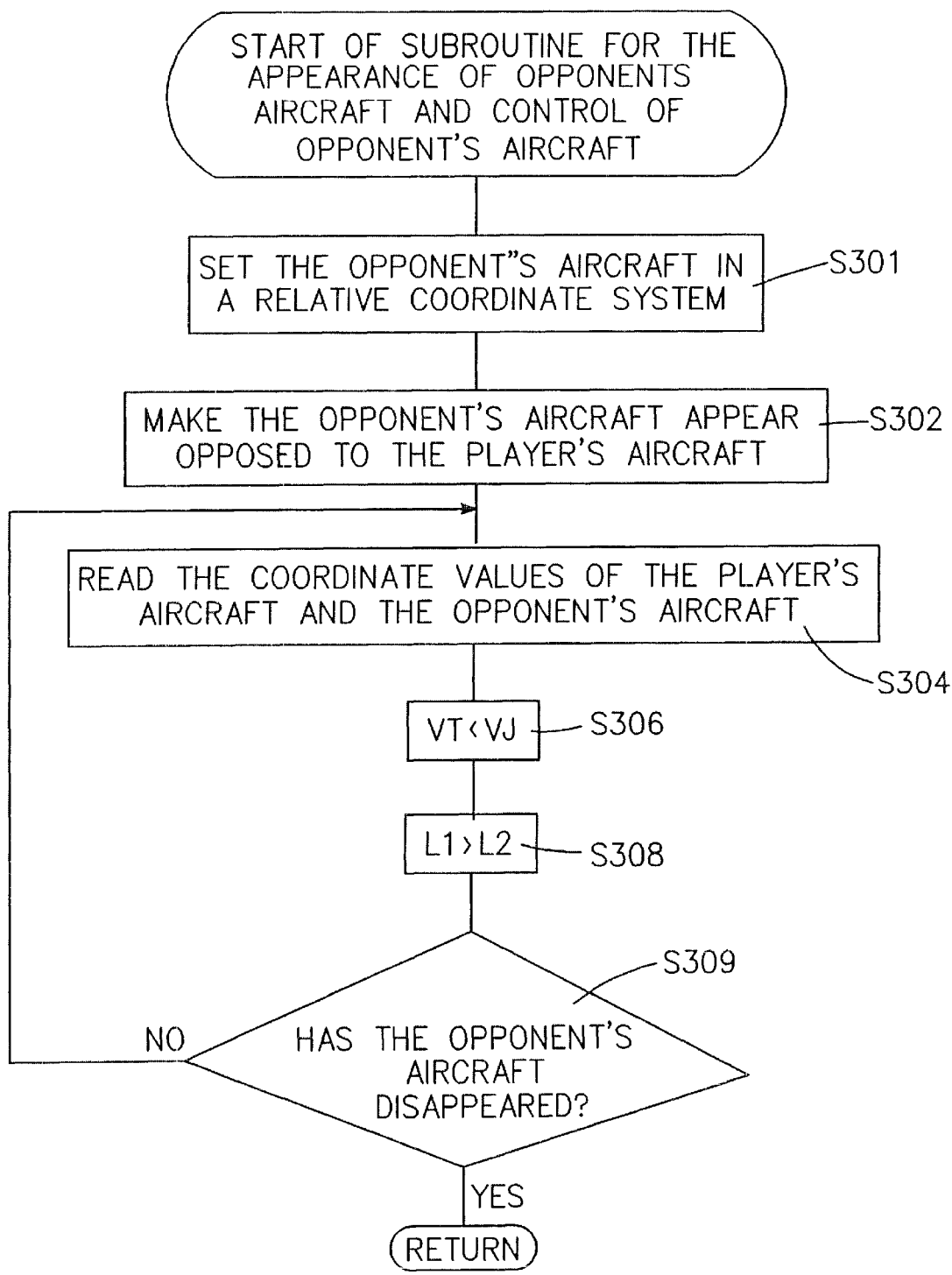
FIG. 8 is a flowchart of a subroutine which describes the appearance of the enemy object or opponent's aircraft and the control of the appeared opponent's aircraft.

Means for performing step S302, as shown in FIG. 8, may be referred to as "first means", S304 as "second means", S306 as "speed setting means" and S308 as "moving direction setting means".

According to the processing described above, since the relative speed of the player's aircraft and the opponent's aircraft is reduced when these aircraft are passing by each other in opposite directions in the three-dimensional coordinate space (opposite movement state), it is possible to extend the state of picture processing to make the player's aircraft and the opponent's aircraft pass by each other. Accordingly, the player can deal with this situation with certainty and can operate the input device, for example, in order to avoid shells fired by the opponent's aircraft or to avoid a collision with the opponent's aircraft.

Figure 12:
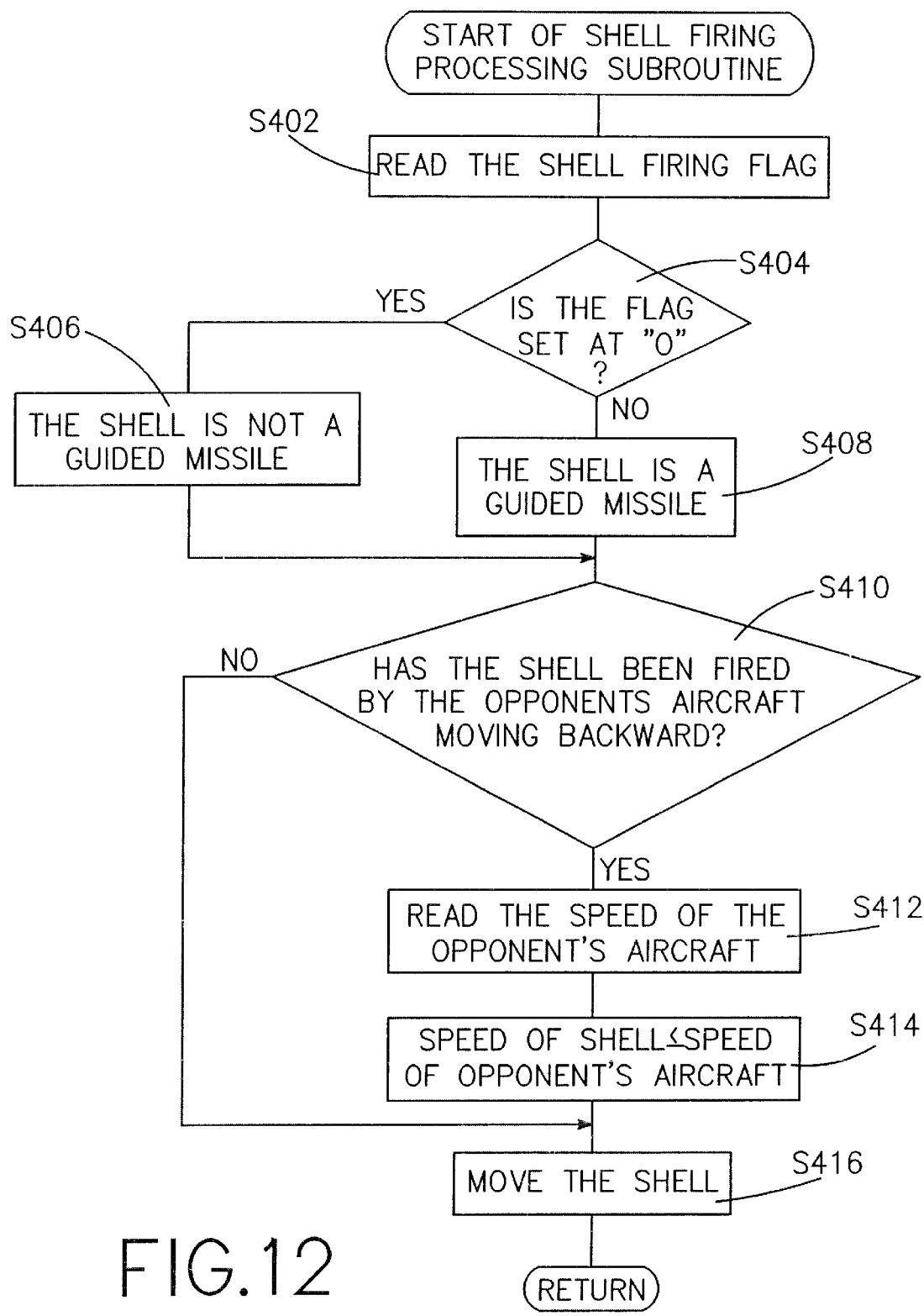
FIG. 12 is a detailed flowchart which describes a shell firing processing.

Next, FIG. 12 explains one of the subroutines for a shell firing processing. This processing mode is activated when a shell firing switch on the operation stick on the player's aircraft side is pushed down, or depending on whether or not the opponent's aircraft has moved into a shell firing point. CPU 101 reads in a shell type flag (S402), and if the shell is not a guided missile (flag="0": S404 through S406), the shell is moved in a straight line along the firing direction of the shell. If the shell is a guided missile (flag="1"), CPU 101 reads in the coordinate value of the object and moves the guided missile toward this coordinate value (S408).

If a shell is fired by the opponent's aircraft moving backward (S410), CPU 101 reads in the absolute speed of the opponent's aircraft from RAM 103 (S412) and sets the speed of the shell at a value no higher than the absolute speed of the player's aircraft (S414). As a result, an image is formed in which the shell fired by the opponent's aircraft passing by the player's aircraft rushes toward the player's aircraft (S416). If the opponent's aircraft is not moving backward at S410, the shell is moved at a predetermined speed (S416).

Figure 13:
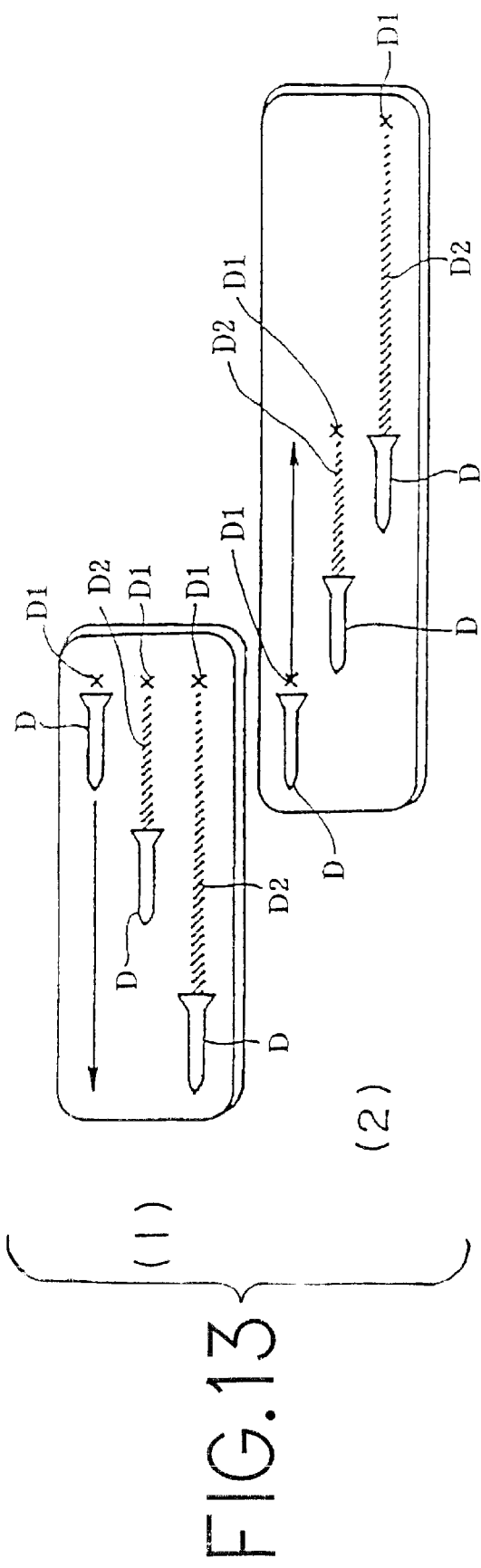
FIG. 13 shows conceptional views describing that firing tracks are left by the shell firing processing.

According to the processing explained above, if the shell is a guided missile D as shown in FIG. 13(1) and moves in an arrow direction, CPU 101 can display a polygon image D2 of smoke, which is a firing track, between the shell and a firing point D1 by storing the coordinates of the firing point D1 in RAM 103. If the guided missile is fired by the opponent's aircraft moving backward, both the guided missile D and the firing point D1 move backward together with the opponent's aircraft in the three-dimensional space as shown in FIG. 13(2). At this point, the moving speed of the firing point D1 is made faster in the background movement than the moving speed of the guided missile D also in the backward movement. As a result, the firing point D1 does not move closer to the player's aircraft, which virtually exists at a coordinate position on the left side of the figure, than to the guided missile D, thereby it is possible to keep a distance between the firing point D1 and the guided missile D and to produce the smoke polygon image between them.

Figure 14:
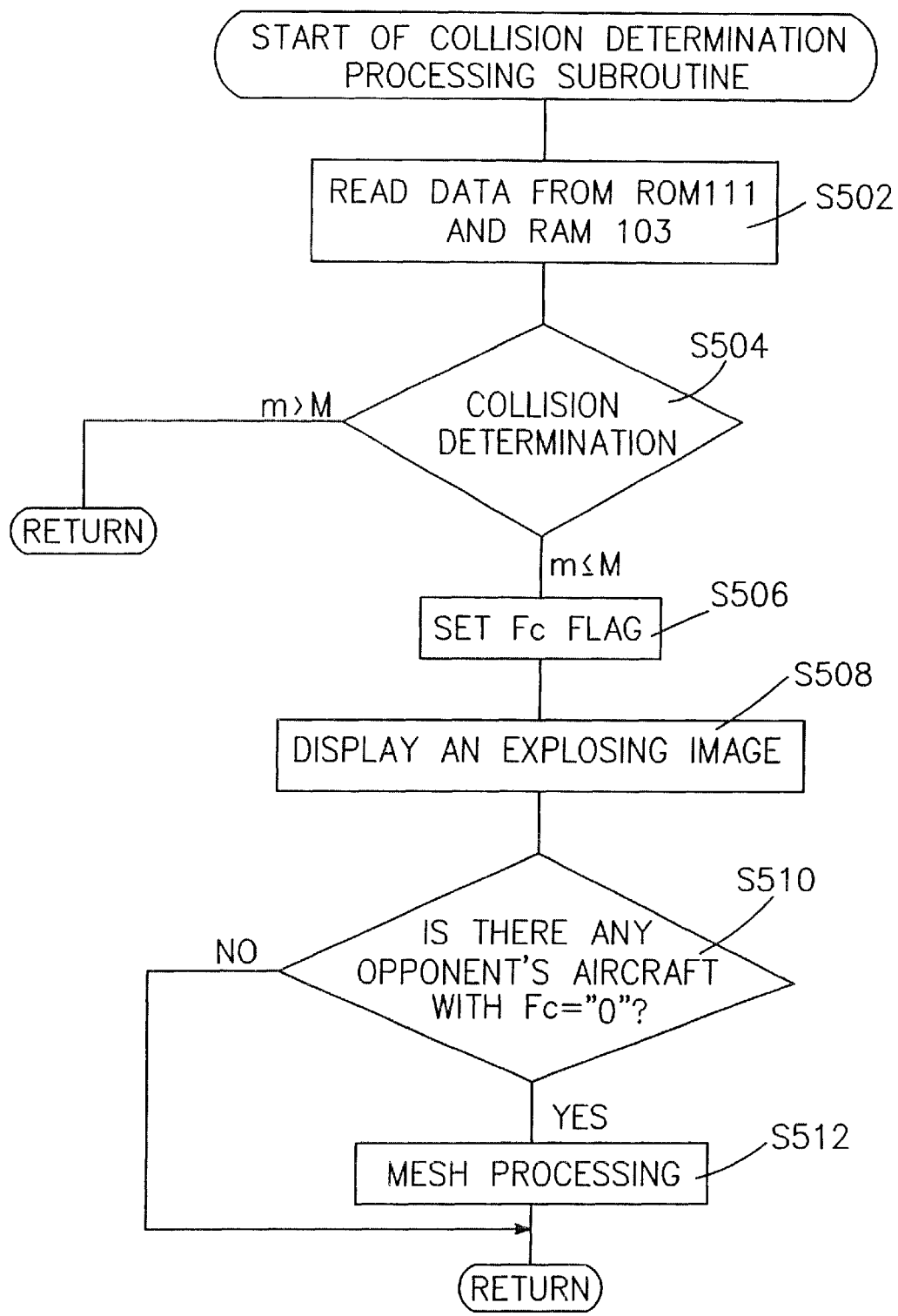
FIG. 14 is a detailed flowchart which explains a collision determination processing.

FIG. 14 explains one of the subroutines for the aforementioned collision determination processing. This collision determination processing determines a collision between the aircraft (the player's aircraft or the opponent's aircraft) and the shell or ground and executes a predetermined picture processing by utilizing the above determination results.

CPU 101 reads in coordinates of these aircraft, shell and ground from ROM 111 or RAM 103 (S502). On the basis of these coordinate positions, co-processor 108 computes a distance between the aircraft and the shell, a distance between the aircraft and the ground, and a distance between the player's aircraft and the opponent's aircraft by using data from ROM 108 and makes the collision determination between them (S504). If the distance (m) is shorter than a predetermined value (M), the co-processor affirms the collision determination. If the collision determination is denied, the co-processor terminates this processing and returns to the main routine in FIG. 3.

Figure 15:
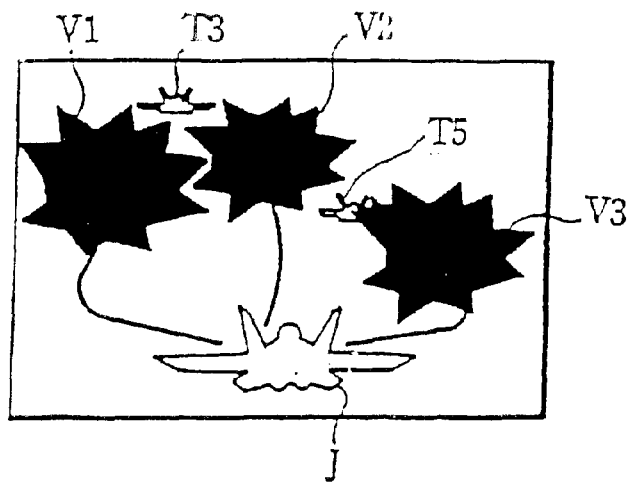
FIG. 15 is an example of the appearance of explosion polygon images in the collision determination processing.

After the collision determination is affirmed, CPU 101 sets "1" in a collision determination flag Fc respectively at the player's aircraft and the opponent's aircraft concerning which the collision has been affirmed (S506). CPU reads in the flag value of each character (the player's aircraft or the opponent's aircraft) in the visual field coordinate system and displays a polygon image of explosion on the character with the flag value "1" (S508). FIG. 15 shows that it is determined that the opponent's aircraft T1, T4 and T6 shown in FIG. 7 have collided with the guided missiles and then the explosion polygon images V1 through V3 are displayed with priority over the characters in the visual field system.

Figure 16:
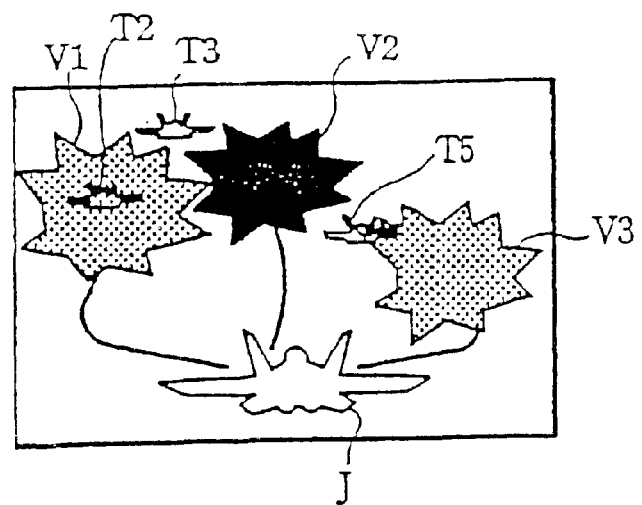
FIG. 16 is another example of the appearance of the explosion polygon images.

CPU 101 determines whether or not there exists any opponent aircraft with which the collision determination flag Fc remains as "0" in the explosion polygon area to be displayed in the visual field coordinate system (S510), and if this determination is affirmed, color pallet data of the explosion polygons are set only for alternate picture elements. In other words, the opponent's aircraft can be recognized through the explosion polygon image by executing a mesh processing to define colors for alternate picture elements within the polygon area. FIG. 16 shows this state. CPU 101 executes this mesh processing concerning the explosion polygons V1 and V3, thereby enabling the player to recognize the opponent's aircraft T2, T3 and T5, which are not the objects of explosion, via the picture elements to which the color data are not given (S512).

On the other hand, when CPU 101 determines that there exits an opponent's aircraft with which the collision determination flag Fc remains as "0" within the area of the explosion polygon image, the explosion image polygon (V2) is composed without executing the mesh processing.

As a result, when a see-through processing such as the mesh processing is not executed concerning the explosion image as shown in FIG. 14, if the player tries to display the explosion image polygon in a large size or to make multiple explosion images appear at once, the image of the aircraft is covered with the explosion image in the visual field coordinate system. On the other hand, if the explosion image is always expressed with the meshed polygon data, a strong appeal of the explosion image will be diminished. However, according to this embodiment, the explosion image is composed of meshed polygons only when necessary. Therefore, as shown in FIG. 16, the explosion image composed of meshed polygon data and the explosion image composed of polygon data which are not meshed (the data with all the picture elements within the polygon area being colored as appropriate) are made to coexist and, therefore, it is possible that the aircraft for which the collision determination flag being set is recoqnized by the player.

As described above, the processing of FIG. 3 executed according to this embodiment provides a game device which can easily operate the aircraft in the air battle game and which gives images with a strong appeal and with superior attractiveness and interest. Moreover, according to this embodiment, it is possible to provide a game device capable of providing images with a strong appeal by changing viewpoints.

The structure to control the moving directions of the player's aircraft and the opponent's aircraft at the same direction is not limited to the above-described structure, and other known methods or structures may be applied. In this embodiment, explanations are given concerning the air battle game device between the player's aircraft and the opponent's aircraft. However, this embodiment can be applied to a game device for realizing a fighting game between water-surface moving objects or a fighting game between ground moving objects.

The aforementioned ROM 102 corresponds to the aforementioned storage medium. ROM 102 is not only mounted on the main game device 10, but also can be newly connected or applied to the main game device from outside the device. Moreover, the picture processing device of the present invention can be materialized even without the operating means or the displaying means. Furthermore, this invention provides a picture processing method for executing the above-described picture processing.

INDUSTRIAL APPLICABILITY

According to the present invention described in claim 1, as the limitation over the moving range of the viewpoint by moving a plurality of objects in substantially the same direction is released, the moving range of the viewpoint can cover other areas, giving rise to the advantage in that the movements of the viewpoint are diversified and the image displayed on the screen can be made to a high-grade image with improved interest and attractiveness for the operator.

This invention described in claim 2 gives rise to the advantage in that the moving direction of the second object can be adjusted at the moving direction of the first object with certainty.

This invention described in claim 3 gives rise to the advantage in that it is possible to control the direction of the object as changing the viewpoint position even after the moving direction control is once terminated.

This invention described in claims 4 and 5 gives rise to the advantage in that the movements of the first object are relaxed and the second object is prevented from moving violently on the displaying means.

This invention described in claim 6 gives rise to the advantage in that it is possible to simplify the operation to move the object at a certain point during the picture processing and to provide a high-grade, varied image by diversifying the movements of the viewpoint when necessary.

This invention described in claim 7 gives rise to the advantage in that the picture processing means can provide a varied image with superior attractiveness and interest by diversifying the movements of the viewpoint.

This invention described in claim 8 gives rise to the advantage in that since the operating means outputs to the picture processing means the operation signals to move the objects in a predetermined direction in the three-dimensional coordinate space, it is possible to apply the above-described picture processing device to, for example, an air battle game device which moves objects in a predetermined direction in the three-dimensional coordinate space.

This invention described in claim 9 gives rise to the advantage in that although the opposing action (mainly, passing by) of a plurality of objects would terminate in a short time if the plurality of objects move in opposite directions at the same relative speed as that applied to the objects moving not in opposite directions, the time required for such opposing action is extended, thereby enabling the player or operator to sufficiently deal with this situation and to give necessary operation inputs to the operating means.

Moreover, this invention described in claim 10 gives rise to the advantage in that since one object is caused to move backward in the coordinate space and a predetermined relative speed is given to the objects in order to decrease the relative speed of these objects, it is possible to extend the time required for the plurality of objects to move in opposite directions with certainty.

Furthermore, this invention described in claim 11 gives rise to the advantage in that the time required for the objects to pass by each other can be set at a desirable figure.

Furthermore, this invention described in claim 12 gives rise to the advantage in that the game device with superior attractiveness and interest can be provided.

What is claimed is:

1. A picture processing device, comprising:
   picture processing means for executing picture processing with respect to a plurality of objects existing in a virtual three-dimensional coordinate space, said plurality of objects including a user-controlled object and a specific enemy object each moving against a background;
   means functionally connected with said picture processing means for generating video signals for displaying an image of said plurality of objects onto displaying means;
   means for receiving operation signals from operation means operated by a player so that movement of said user-controlled object is controlled in said coordinate space in accordance with the operation signals from said operation means;
   said picture processing means comprising:
      moving direction control means for adjusting the relative movement between said specific enemy object and said user-controlled object so that said usercontrolled and enemy objects move in the same direction while the specific enemy object is positioned in front of said user-controlled object; and
      moving direction control release means for releasing the moving direction control means when said user-controlled object reaches said specific enemy object.

2. A device according to claim 1, wherein said moving direction controlling means comprises:
   moving direction detecting means for detecting the moving direction of said user-controlled object; and
   moving direction setting means for adjusting the moving direction of said enemy object at the moving direction of said user-controlled object on the basis of the detection results.

3. A device according to claim 1, wherein said picture processing means further comprises moving direction re-controlling means for moving said objects along another course after the moving direction control means is released by said moving direction control releasing means.

4. A device according to claim 2, wherein said moving direction control means further comprises moving range regulating means for regulating the range within which said user-controlled object can move in said coordinate system on the basis of said operation signals.

5. A device according to claim 4, wherein said moving direction regulating means regulates the moving range of said user-controlled object in an absolute coordinate system and outputs a command to said moving direction setting means to set the moving direction of said enemy object at the moving direction of said user-controlled object in a relative coordinate system.

6. A device according to claim 3, wherein said moving direction re-controlling means moves said objects along a course to fly around said specific enemy object when the picture processing is executed to display the specific enemy object on the displaying means.

7. A picture processing device to display an image, as seen from a predetermined viewpoint, comprising;
   picture processing means for executing picture processing of a plurality of objects existing in a virtual three-dimensional coordinate space, said plurality of objects including a user-controlled object and a specific enemy object each moving against a background;
   means functionally connected with said picture processing means for generating video signals for displaying an image of said plurality of objects onto displaying means;
   means for receiving operation signals from operation means operated by a player so that movement of said user-controlled object is controlled in said coordinate space in accordance with the operation signals from said operation means,
   said picture processing means comprising object movement controlling means for moving said user-controlled object along a course to fly around specific enemy object, with said course having several points positioned around substantially the entire specific enemy object.

8. A picture processing device, comprising:
   picture processing means for executing picture processing with respect to a plurality of objects existing in a virtual three-dimensional coordinate space, said plurality of objects including a user-controlled object and an enemy object each moving against a background;
   means functional connected with said picture processing means for generating video signals for displaying an image of said plurality of objects onto displaying means;
   means for receiving operating signals for operation means operated by a player so that movement of said user-controlled object is controlled in said coordinate space in accordance with the operation signals from said operation means;
   said picture processing means comprising:
      first means for moving said user-controlled and enemy objects in directions opposite to each other in said space; and
      second means for decreasing a relative speed between said usercontrolled and enemy objects when moving to pass each other.

9. A device according to claim 8, wherein said first means executes picture processing to cause said user-controlled and enemy objects to pass by each other along substantially the same course, said second means comprises speed setting means for moving said user-controlled and enemy objects in the same direction in said coordinate space and for giving predetermined relative speed to these objects.

10. A device according to claim 9, wherein the speed setting means sets said relative speed to correspond to that time required for said user-controlled and enemy objects to pass by each other in the three-dimensional coordinate space.

11. A picture processing device, comprising picture processing means for executing picture processing to display an image, as seen from a predetermined viewpoint, of a plurality of objects existing in a three-dimensional coordinate space onto displaying means, said picture processing means executing picture processing to move said objects in said coordinate space at a predetermined speed in accordance with operation signals from operating means for operating said objects, wherein said picture processing means comprises:

first means for setting a speed of the objects by simulating actual behaviors of the objects; and second means for controlling a relative speed of the plurality of objects moving in directions opposite to each other in the coordinate space at a value lower than a relative speed based on the speed set by said first means.

12. A storage medium for storing procedures of the picture processing device as claimed in any one of claims 1, 7, 8 or 11 comprising a computer and a processor cooperating therewith to perform the functions of the picture processing device.

13. A game device including a picture processing device as claimed in any one of claims 1, 7, 8 or 11, comprising display means.

\* \* \* \* \*